(12) United States Patent
Islam et al.

(10) Patent No.: US 11,445,460 B2
(45) Date of Patent: Sep. 13, 2022

(54) FLEXIBLE CONFIGURATION OF SYNCHRONIZATION SIGNAL BLOCK TIME LOCATIONS

(71) Applicant: QUALCOMM Incorporated, San Diego, CA (US)

(72) Inventors: Muhammad Nazmul Islam, Littleton, MA (US); Navid Abedini, Somerset, NJ (US); Jianghong Luo, Skillman, NJ (US); Karl Georg Hampel, Hoboken, NJ (US); Tao Luo, San Diego, CA (US); Junyi Li, Chester, NJ (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 16/677,409

(22) Filed: Nov. 7, 2019

(65) Prior Publication Data

US 2020/0205102 A1   Jun. 25, 2020

Related U.S. Application Data

(60) Provisional application No. 62/782,971, filed on Dec. 20, 2018.

(51) Int. Cl.
*H04W 56/00* (2009.01)
*H04W 24/10* (2009.01)
(Continued)

(52) U.S. Cl.
CPC ......... *H04W 56/002* (2013.01); *H04L 5/0051* (2013.01); *H04L 5/10* (2013.01);
(Continued)

(58) Field of Classification Search
CPC . H04W 56/002; H04W 24/10; H04W 72/005; H04W 80/02; H04W 72/0446;
(Continued)

(56) References Cited

U.S. PATENT DOCUMENTS

2016/0277225 A1* 9/2016 Frenne ................. H04L 27/261
2018/0192384 A1* 7/2018 Chou ................... H04W 72/044
(Continued)

FOREIGN PATENT DOCUMENTS

| CA | 3031087 A1 | 11/2018 |
|---|---|---|
| WO | WO-2018204260 A1 | 11/2018 |

OTHER PUBLICATIONS

International Search Report and Written Opinion—PCT/US2019/060462—ISA/EPO—dated Mar. 16, 2020.
(Continued)

*Primary Examiner* — Rina C Pancholi
(74) *Attorney, Agent, or Firm* — Harrity & Harrity, LLP

(57) ABSTRACT

When time locations of synchronization signal (SS) blocks (SSBs) are fixed within an SS burst set, the time locations and the slot pattern may be incompatible. In this case, the base station may not be permitted to transmit that SSBs that overlap in time with a configured uplink symbols because the base station is configured to receive uplink communications during this time, rather than transmit downlink communications during this time. As a result, the base station may have fewer opportunities to transmit SSBs, which may lead to increased latency due to delays in accessing the base station, may reduce spectral efficiency due to fewer opportunities to indicate beamforming parameters and/or fewer beams being used for communications, and/or the like. Some techniques and apparatuses described herein permit the base station to flexibly configure time
(Continued)

locations of SSBs within an SS burst set, thereby reducing latency, improving spectral efficiency, and/or the like.

30 Claims, 12 Drawing Sheets

(51) Int. Cl.
  *H04W 72/00* (2009.01)
  *H04W 80/02* (2009.01)
  *H04L 5/10* (2006.01)
  *H04L 5/00* (2006.01)
  *H04W 72/04* (2009.01)

(52) U.S. Cl.
  CPC ......... *H04W 24/10* (2013.01); *H04W 72/005* (2013.01); *H04W 72/0446* (2013.01); *H04W 80/02* (2013.01)

(58) Field of Classification Search
  CPC ...... H04W 56/001; H04L 5/10; H04L 5/0051; H04L 5/005; H04L 5/0053
  See application file for complete search history.

(56) References Cited

U.S. PATENT DOCUMENTS

| | | | |
|---|---|---|---|
| 2018/0192404 A1* | 7/2018 | Maaref | H04L 5/0048 |
| 2019/0387485 A1* | 12/2019 | Ko | H04W 72/005 |
| 2020/0137700 A1* | 4/2020 | Zhang | H04W 52/0216 |
| 2021/0007065 A1* | 1/2021 | Ko | H04W 56/00 |

OTHER PUBLICATIONS

ITL: "Remaining Details on SS Block and Timing Indication"3GPP Draft, 3GPP TSG RAN WG1 Meeting #90, R1-1714405, 3rd, Generation Partnership Project (3GPP), Mobile Competence Centre, 650, Route Des Lucioles, F-06921 Sophia-Antipolis Cedex, France, vol. RAN WG1, No. Prague, P.R. Czechia, Aug. 21, 2017-Aug. 25, 2017, Aug. 20, 2017 (Aug. 20, 2017), XP051317185, 4 Pages Retrieved from the Internet: URL: http://www.3gpp.org/ftp/Meetings_3GPP_SYNC/RAN1/Docs/, [retrieved on Aug. 20, 2017].

MCC Support: "Final Report of 3GPP TSG RAN WG 1 #90 v1.0.0", 3GPP TSG RAN WG1 Meeting #90bis, 3GPP, R1-1716941, vol. 00, No. 21, Oct. 5, 2017 (Oct. 5, 2017), pp. 1-172, XP055673012, p. 64-68, p. 66, Working Assumptions.

Samsung: "Remaining Details on SS Block and SS Burst Set Design", 3GPP Draft, 3GPP TSG RAN WG1 #90, R1-1713552 Remaining Issues on SS Burst Set Composition_V4, 3rd Generation Partnership Project (3GPP), Mobile Competence Centre, 650, Route Des Lucioles, F-06921 Sophia-Antipolis Cedex, vol. RAN WG1, No. Prague, P.R. Czechia, Aug. 21, 2017-Aug. 25, 2017, Aug. 20, 2017 (Aug. 20, 2017), XP051316352, 4 Pages, Retrieved from the Internet: URL: http://www.3gpp.org/ftp/Meetings_3GPP_SYNC/RAN1/Docs/, [retrieved on Aug. 20, 2017], Section 1, Section 2, Section 3.

ZTE, et al., "Composition of SS Block, Burst and Burst Set", 3GPP Draft, 3GPP TSG RAN WG1 Meeting #88bis, R1-1704358, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Mar. 25, 2017 (Mar. 25, 2017), XP051251161, 14 Pages, Retrieved from the Internet: URL: http://www.3gpp.org/ftp/tsg_ran/WG1_RL1/fSGR1 88b/Docs/, [retrieved on Mar. 25, 2017], Section 5, Section 6.

\* cited by examiner

FLEXIBLE CONFIGURATION OF SYNCHRONIZATION SIGNAL BLOCK TIME LOCATIONS

CROSS-REFERENCE TO RELATED APPLICATION

This application claims priority to U.S. Provisional Patent Application No. 62/782,971, filed on Dec. 20, 2018, entitled "FLEXIBLE CONFIGURATION OF SYNCHRONIZATION SIGNAL BLOCK TIME LOCATIONS," which is hereby expressly incorporated by reference herein.

BACKGROUND

Field

Aspects of the present disclosure generally relate to wireless communication and to techniques and apparatuses for flexible configuration of synchronization signal block time locations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A base station may be capable of flexibly configuring a slot pattern (e.g., a time division duplex (TDD) downlink (DL) uplink (UL) slot pattern) that indicates a first set of slots and/or symbols to be used for downlink communications and a second set of slots and/or symbols to be used for uplink communications. When time locations of synchronization signal (SS) blocks (SSBs) are fixed within an SS burst set, the time locations and the slot pattern may be incompatible. For example, the base station may configure a slot pattern that has an uplink slot and/or a set of uplink symbols in a time location corresponding to an SSB. In this case, the base station may not be permitted to transmit that SSB or other SSBs that overlap in time with a configured uplink slot and/or uplink symbol because the base station is configured to receive communications on the uplink during this time, rather than transmit communications (e.g., SSBs) on the downlink during this time. As a result, the base station may have fewer opportunities to transmit SSBs, which may lead to increased latency due to delays in accessing the base station, may reduce spectral efficiency due to fewer opportunities to indicate beamforming parameters and/or fewer beams being used for communications, and/or the like. Some techniques and apparatuses described herein permit the base station to flexibly configure time locations of SSBs within an SS burst set, thereby reducing latency, improving spectral efficiency, and/or the like.

Furthermore, the number of SSBs per SS burst set may be fixed, such as 64 SSBs per SS burst set. In some aspects, different SSBs in the SS burst set may be transmitted via different beams. In this case, the number of beams may be limited to the number of SSBs, such as 64 beams for the case of 64 SSBs per SS burst set. However, some scenarios may require more than 64 beams for more precise beamforming and/or more efficient use of spectral resources, such as an integrated access and backhaul (IAB) network, which may use beamforming for both access links and backhaul links with a large number of IAB donors, IAB nodes, and/or UEs. However, the capability to convey more than 64 SSB indices may require additional overhead. Some techniques and apparatuses described herein permit additional SSB indices to be conveyed without using additional network overhead.

In an aspect of the disclosure, a method, a user equipment, a base station, an apparatus, and a computer program product are provided.

In some aspects, the method may by performed by a UE. The method may include receiving an indication of one or more time locations corresponding to one or more SSBs included in an SS burst set; detecting an SSB of the one or more SSBs; and determining a cell timing based at least in part on the indication and an index of the detected SSB.

In some aspects, the UE may include a memory and one or more processors operatively coupled to the memory. The memory and the one or more processors may be configured to receive an indication of one or more time locations corresponding to one or more SSBs included in an SS burst set; detect an SSB of the one or more SSBs; and determine a cell timing based at least in part on the indication and an index of the detected SSB.

In some aspects, the apparatus may include means for receiving an indication of one or more time locations corresponding to one or more SSBs included in an SS burst set; means for detecting an SSB of the one or more SSBs; and means for determining a cell timing based at least in part on the indication and an index of the detected SSB.

In some aspects, the computer program product may include a non-transitory computer-readable medium storing one or more instructions. The one or more instructions, when executed by one or more processors of a UE, may cause the one or more processors to receive an indication of one or more time locations corresponding to one or more SSBs included in an SS burst set; detect an SSB of the one or more SSBs; and determine a cell timing based at least in part on the indication and an index of the detected SSB.

In some aspects, the method may by performed by a UE. The method may include detecting an SSB; determining an index value of the SSB, wherein a portion of the index value is indicated using one or more bits of a master information block (MIB) included in the SSB, and wherein a total number of allowed SSBs is greater than 64; and determining a cell timing based at least in part on the index value.

In some aspects, the UE may include a memory and one or more processors operatively coupled to the memory. The memory and the one or more processors may be configured to detect an SSB; determine an index value of the SSB, wherein a portion of the index value is indicated using one or more bits of an MIB included in the SSB, and wherein a total number of allowed SSBs is greater than 64; and determine a cell timing based at least in part on the index value.

In some aspects, the apparatus may include means for detecting an SSB; means for determining an index value of the SSB, wherein a portion of the index value is indicated using one or more bits of an MIB included in the SSB, and wherein a total number of allowed SSBs is greater than 64; and means for determining a cell timing based at least in part on the index value.

In some aspects, the computer program product may include a non-transitory computer-readable medium storing one or more instructions. The one or more instructions, when executed by one or more processors of a UE, may cause the one or more processors to detect an SSB; determine an index value of the SSB, wherein a portion of the index value is indicated using one or more bits of an MIB included in the SSB, and wherein a total number of allowed SSBs is greater than 64; and determine a cell timing based at least in part on the index value.

In some aspects, the method may by performed by a base station. The method may include determining one or more time locations corresponding to one or more SSBs, wherein a time location for an SSB indicates a location in time of the SSB within an SS burst set or within an SSB measurement time configuration (SMTC) window; and transmitting, to a UE, an indication of the one or more time locations.

In some aspects, the base station may include a memory and one or more processors operatively coupled to the memory. The memory and the one or more processors may be configured to determine one or more time locations corresponding to one or more SSBs, wherein a time location for an SSB indicates a location in time of the SSB within an SS burst set or within an SMTC window; and transmit, to a UE, an indication of the one or more time locations.

In some aspects, the apparatus may include means for determining one or more time locations corresponding to one or more SSBs, wherein a time location for an SSB indicates a location in time of the SSB within an SS burst set or within an SMTC window; and means for transmitting, to a UE, an indication of the one or more time locations.

In some aspects, the computer program product may include a non-transitory computer-readable medium storing one or more instructions. The one or more instructions, when executed by one or more processors of a base station, may cause the one or more processors to determine one or more time locations corresponding to one or more SSBs, wherein a time location for an SSB indicates a location in time of the SSB within an SS burst set or within an SMTC window; and transmit, to a UE, an indication of the one or more time locations.

In some aspects, the method may by performed by a base station. The method may include transmitting a SSB; and transmitting an index value for the SSB, wherein a portion of the index value is indicated using one or more bits of an MIB included in the SSB, and wherein a total number of allowed SSBs is greater than 64.

In some aspects, the base station may include a memory and one or more processors operatively coupled to the memory. The memory and the one or more processors may be configured to transmit an SSB; and transmit an index value for the SSB, wherein a portion of the index value is indicated using one or more bits of an MIB included in the SSB, and wherein a total number of allowed SSBs is greater than 64.

In some aspects, the apparatus may include means for transmitting an SSB; and means for transmitting an index value for the SSB, wherein a portion of the index value is indicated using one or more bits of an MIB included in the SSB, and wherein a total number of allowed SSBs is greater than 64.

In some aspects, the computer program product may include a non-transitory computer-readable medium storing one or more instructions. The one or more instructions, when executed by one or more processors of a base station, may cause the one or more processors to transmit an SSB; and transmit an index value for the SSB, wherein a portion of the index value is indicated using one or more bits of an MIB included in the SSB, and wherein a total number of allowed SSBs is greater than 64.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
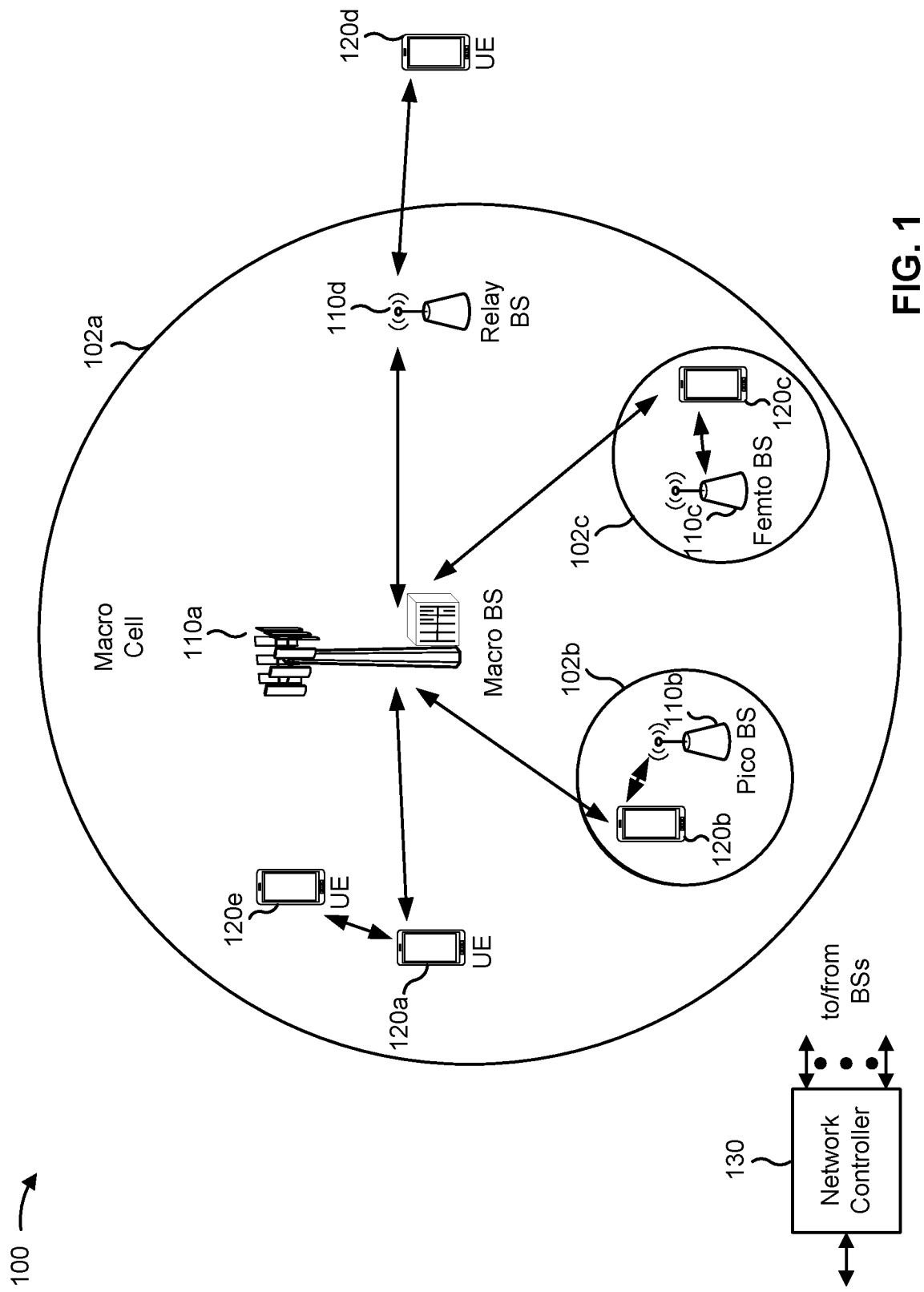
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes non-transitory computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, base station 110 may include a single TRP or multiple TRPs. Additionally, or alternatively, base station 110 may include an integrated access and backhaul (IAB) donor in an IAB network, an IAB node, and/or the like.

As indicated above, FIG. 1 is provided merely as an example. Other examples may differ from what is described with regard to FIG. 1.

Figure 2:
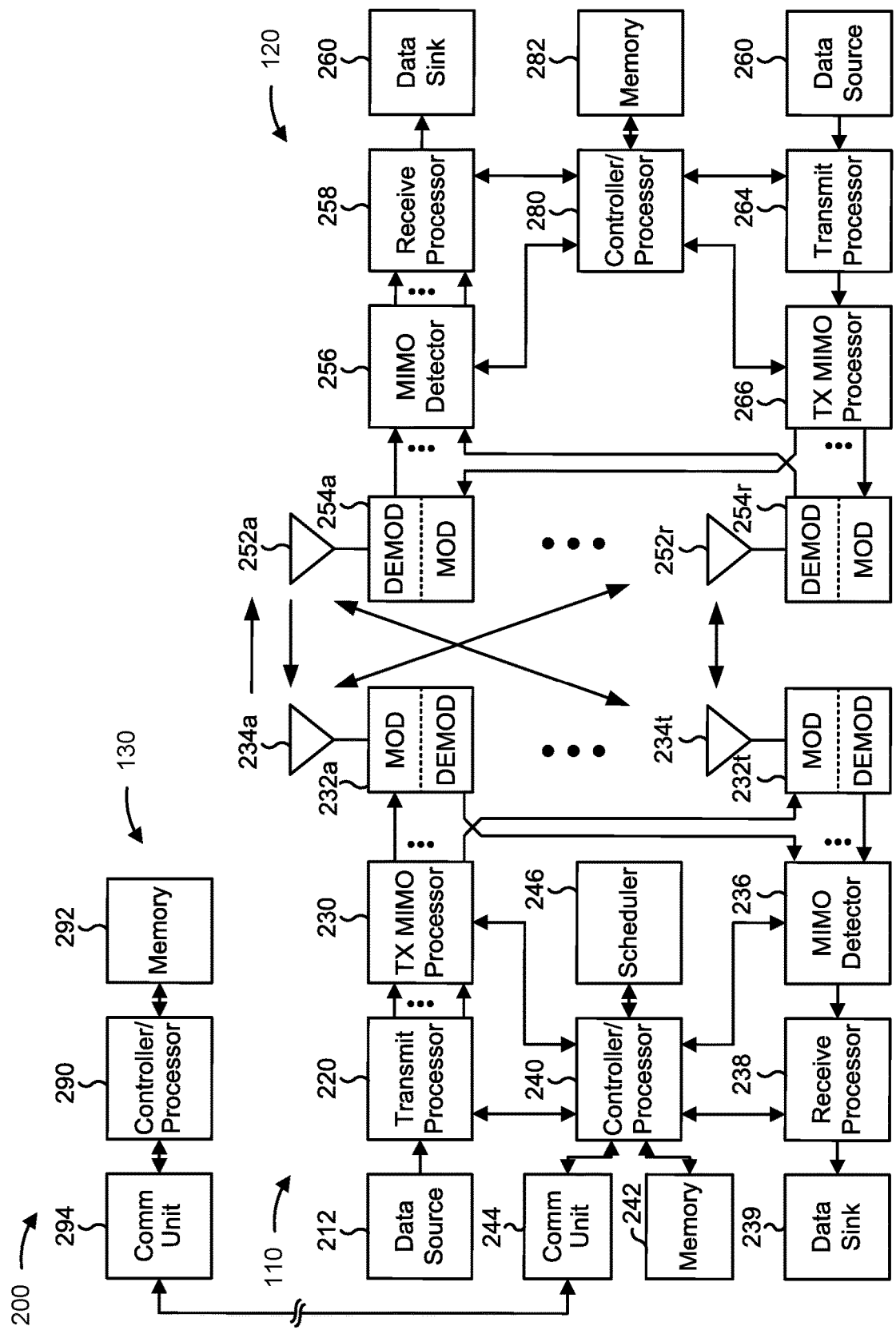
FIG. 2 is a diagram illustrating an example of a base station in communication with a user equipment in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with flexible configuration of synchronization signal block time locations, as described in more detail elsewhere herein. For example, controller/processor 240 of base station 110, controller/processor 280 of UE 120, and/or any other component(s) of FIG. 2 may perform or direct operations of, for example, method 500 of FIG. 5, method 600 of FIG. 6, method 700 of FIG. 7, method 800 of FIG. 8, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
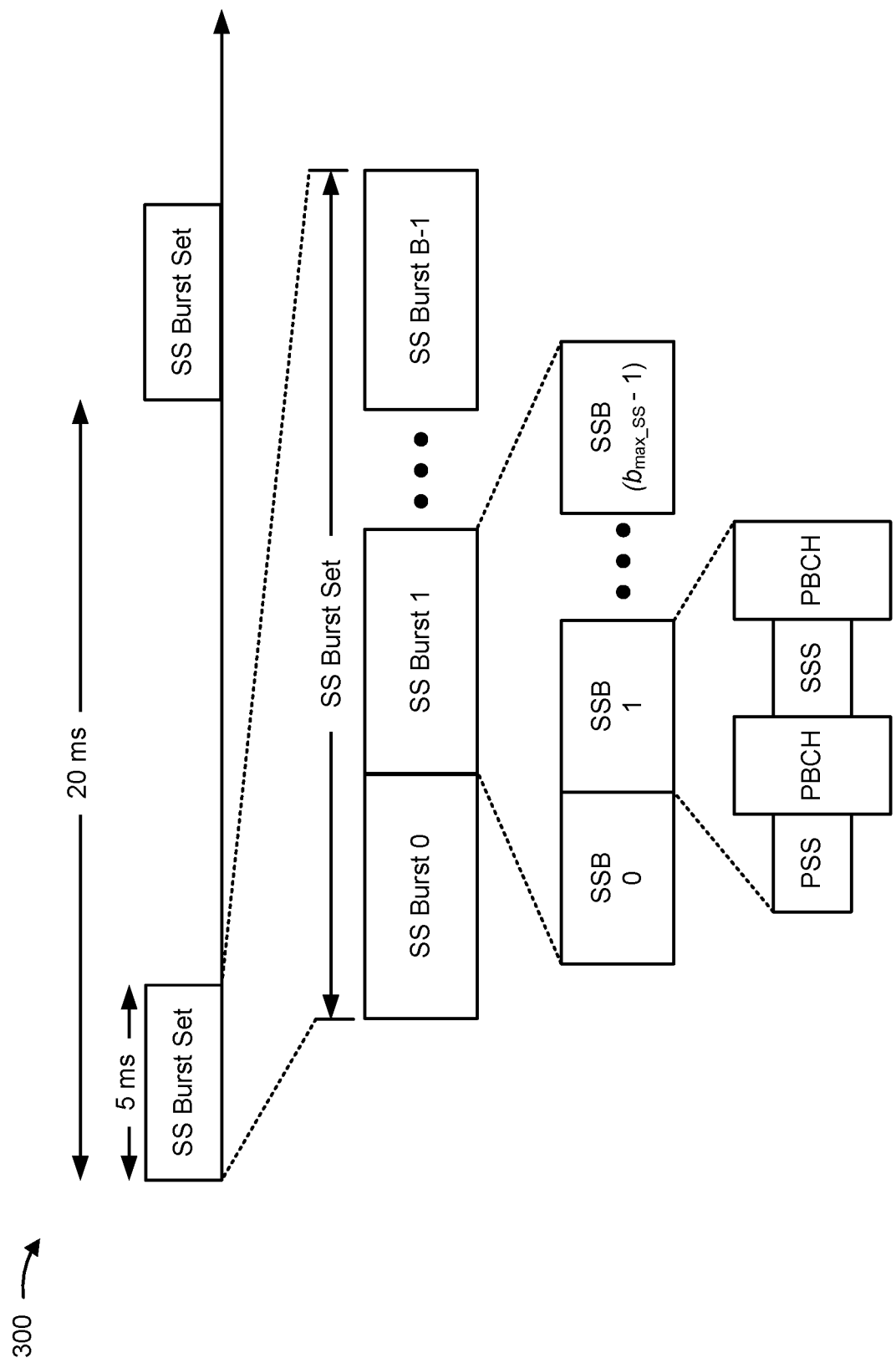
FIG. 3 is a diagram illustrating an example synchronization signal hierarchy in a wireless communication network.

FIG. 3 is a block diagram illustrating an example synchronization signal (SS) hierarchy in a wireless communication network. As shown in FIG. 3, the SS hierarchy may include an SS burst set, which may include a plurality of SS bursts (shown as SS burst 0 through SS burst B-1, where B is a maximum number of repetitions of the SS burst that may be transmitted by the base station 110). As further shown, each SS burst may include one or more SS blocks (SSBs) (shown as SSB 0 through SSB (bmax_SS-1), where bmax_SS-1 is a maximum number of SSBs that can be included in an SS burst). In some aspects, different SSBs may be beam-formed differently. An SS burst set may be periodically transmitted by a wireless node, such as every X milliseconds, shown as 20 milliseconds in FIG. 3. In some aspects, an SS burst set may have a fixed or dynamic length of Y milliseconds, shown as 5 milliseconds in FIG. 3.

An SSB includes resources that carry a primary synchronization signal (PSS), a secondary synchronization signal (SSS), a physical broadcast channel (PBCH), and/or other synchronization signals and/or synchronization channels. In some aspects, multiple SSBs are included in an SS burst, and the PSS, the SSS, and/or the PBCH may be the same across each SSB of the SS burst. In some aspects, the SSB may be at least four symbol periods in length, where each symbol carries one or more of the PSS (e.g., occupying one symbol), the SSS (e.g., occupying one symbol), and/or the PBCH (e.g., occupying two symbols). In some aspects, the PBCH may occupy more resource blocks and/or frequency locations than the PSS and/or the SSS.

In some aspects, the symbols of an SSB are consecutive, as shown in FIG. 3. In some aspects, the symbols of an SSB are non-consecutive. Similarly, in some aspects, two or more consecutive SSBs of the SS burst may be transmitted in consecutive radio resources (e.g., consecutive symbol periods) during one or more slots. Additionally, or alternatively, two or more consecutive SSBs of the SS burst may be transmitted in non-consecutive radio resources.

In some aspects, the SS bursts may have a burst period, whereby the SSBs of the SS burst are transmitted by the base station 110 according to the burst period. In other words, the SSBs may be repeated across each SS burst. In some aspects, the SS burst set may have a burst set periodicity, whereby the SS bursts of the SS burst set are transmitted by the base station 110 according to the fixed burst set periodicity. In other words, the SS bursts may be repeated across each SS burst set.

The base station 110 may transmit system information, such as one or more system information blocks (SIBs) on a physical downlink shared channel (PDSCH) in certain slots. The base station 110 may transmit control information/data on a physical downlink control channel (PDCCH) in C symbols of a slot, where C may be configurable for each slot. In some aspects, the base station 110 may transmit traffic data and/or other data on the PDSCH in the remaining symbol periods of each slot.

The time locations of the SSBs within the SS burst set may be fixed (e.g., within a 5 millisecond time period occupied by the SS burst set). For example, the SSBs may occupy the same symbols in each SS burst set, and those symbols may not be configurable by the base station 110. As a result, SSBs having the same index (e.g., the same index value) may occur in the same set of symbols (e.g., the same 4 symbols) across each SS burst set. A base station 110 may transmit the SSBs, and the UE 120 may detect an SSB. When the UE 120 detects an SSB, the UE 120 may determine an index of the SSB, and may use the index to determine a cell timing (e.g., to synchronize a boundary of a transmission time interval (TTI) with the base station 110, such as a symbol, a slot, a subframe, a frame, and/or the like). Because the time locations of the SSBs are fixed, an SSB with a specific index will always occur at the same time location (e.g., the same set of symbols) within each SS burst set, which allows the UE 120 to accurately determine the cell timing using an index of a detected SSB.

The determination of cell timing may be performed in association with initial network access, such as initial access to a non-standalone (NSA) wireless network (e.g., that uses a 4G core network with a 4G component carrier and/or default bearer, with supplemental 5G component carriers and/or bearers being added), initial access to a standalone (SA) wireless network (e.g., that uses only 4G or only 5G component carriers and/or bearers), and/or the like. Additionally, or alternatively, the determination of cell timing may be performed in a mobility scenario where the UE 120 is connected to a serving cell and determines cell timing for one or more neighbor cells.

However, the base station 110 may be capable of flexibly configuring a slot pattern (e.g., a time division duplex (TDD) downlink (DL) uplink (UL) slot pattern) that indicates a first set of slots and/or symbols to be used for downlink communications and a second set of slots and/or symbols to be used for uplink communications. Because the time locations of the SSBs are fixed within an SS burst set, the time locations and the slot pattern may be incompatible. For example, the base station 110 may configure a slot pattern that has an uplink slot and/or a set of uplink symbols in a time location corresponding to an SSB. In this case, the base station 110 may not be permitted to transmit that SSB or other SSBs that overlap in time with a configured uplink slot and/or uplink symbol because the base station 110 is configured to receive communications on the uplink during this time, rather than transmit communications (e.g., SSBs) on the downlink during this time.

As a result, the base station 110 may have fewer opportunities to transmit SSBs, which may lead to increased latency due to delays in accessing the base station 110 (e.g., a UE 120 may experience delays in detecting an SSB due to incompatibilities between the fixed SSB time locations and a slot pattern), may reduce spectral efficiency due to fewer opportunities to indicate beamforming parameters and/or fewer beams being used for communications (e.g., where an SSB index is used to determine a spatial parameter for beamforming), and/or the like. Some techniques and apparatuses described herein permit the base station 110 to flexibly configure time locations of SSBs within an SS burst set (e.g., based at least in part on a slot pattern used by the base station 110), thereby reducing latency, improving spectral efficiency, and/or the like.

Furthermore, the number of SSBs per SS burst set may be fixed, such as 64 SSBs per SS burst set (e.g., having indices of 0 through 63). In some aspects, different SSBs in the SS burst set may be transmitted via different beams (e.g., in different directions, having different spatial parameters, and/or the like). In this case, the number of beams may be limited to the number of SSBs, such as 64 beams for the case of 64 SSBs per SS burst set. However, some scenarios may require more than 64 beams for more precise beamforming and/or more efficient use of spectral resources, such as an integrated access and backhaul (IAB) network, which may use beamforming for both access links and backhaul links with a large number of IAB donors, IAB nodes, and/or UEs 120 (sometimes referred to as mobile terminals (MTs) in an IAB network). However, the capability to convey more than 64 SSB indices may require additional overhead (e.g., more bits to convey an SSB index). Some techniques and apparatuses described herein permit additional SSB indices to be conveyed without using additional network overhead. Additional details are described below.

As indicated above, FIG. 3 is provided as an example. Other examples may differ from what is described with regard to FIG. 3.

Figure 4:
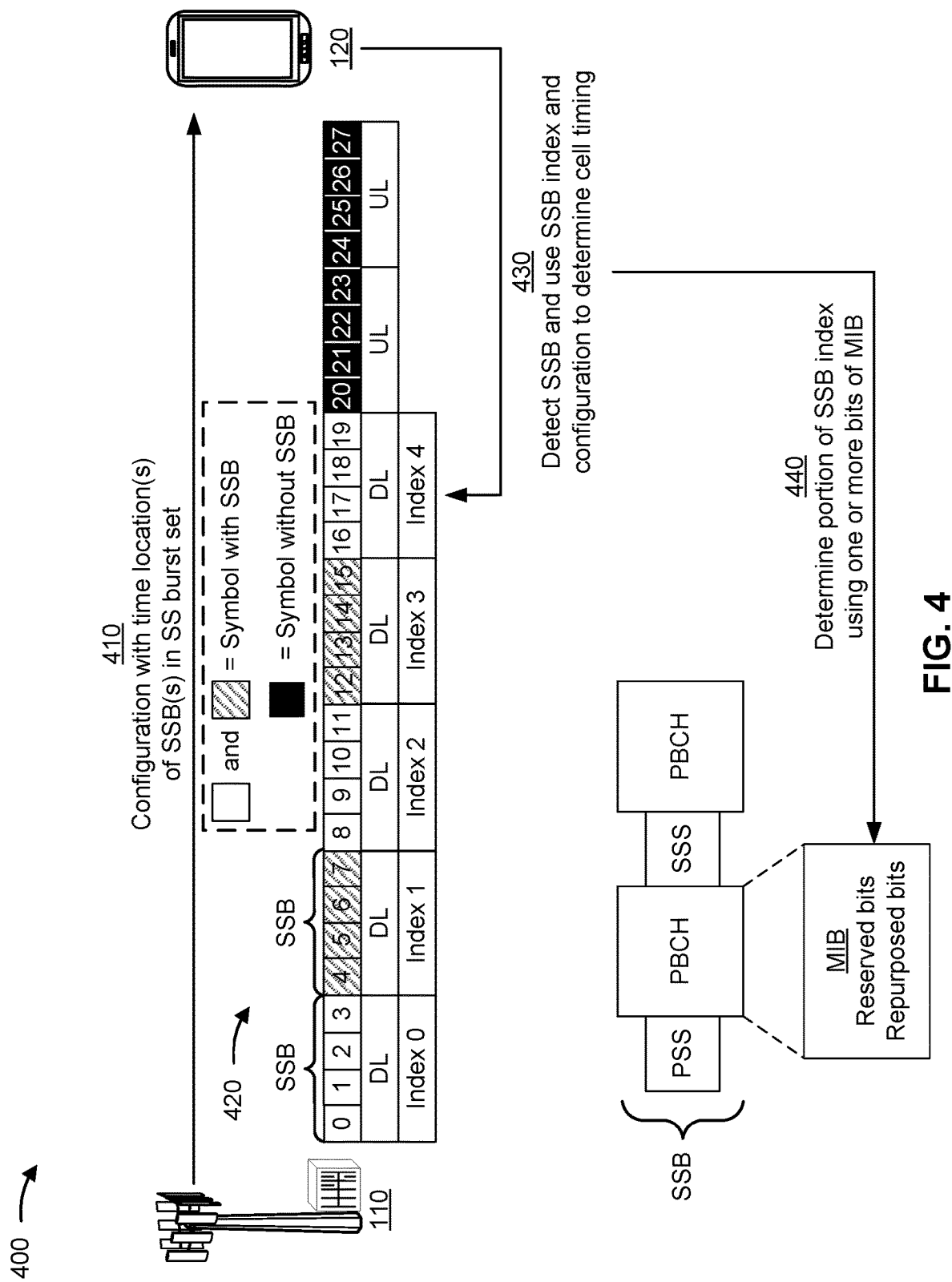
FIG. 4 is a diagram illustrating an example of flexible configuration of synchronization signal block time locations.

FIG. 4 is a diagram illustrating an example 400 of flexible configuration of synchronization signal block time locations.

As shown in FIG. 4, a base station 110 may communicate with a UE 120. In some aspects, the base station 110 may include a node in an IAB network, such as an IAB donor, an IAB node, and/or the like. In some aspects, the UE 120 is connected to a serving cell, and the base station 110 corresponds to the serving cell. Additionally, or alternatively, the base station 110 may correspond to a neighbor cell.

As shown by reference number 410, the base station 110 may transmit, and the UE 120 may receive, a configuration that indicates one or more time locations of SSBs in an SS burst set (or in another time window, as described below). In some aspects, the configuration may be transmitted in a radio resource control (RRC) message (e.g., an RRC configuration message, an RRC reconfiguration message, and/or the like), a media access control (MAC) control element (CE) (MAC-CE), system information (e.g., a system information block (SIB), remaining minimum system information (RMSI), and/or the like), and/or the like.

In some aspects, the base station 110 may determine the one or more time locations for the SSBs based at least in part on a slot pattern (e.g., a TDD DL UL slot pattern) associated with the base station 110 (e.g., used by the base station 110 to communicate with the UE 120, configured by the base station 110, configured for one or more UEs 120, and/or the like). For example, the base station 110 may configure and/or select the one or more time locations to coincide with downlink slots and/or downlink symbols of the slot pattern. For example, the base station 110 may configure symbols of SSBs (e.g., all symbols of all SSBs) in the SS burst set to occur in downlink symbols of the slot pattern. In this way, the base station 110 may ensure that all SSBs are capable of being transmitted by the base station 110, thereby reducing latency, improving spectral efficiency, and/or the like, as described elsewhere herein.

In some aspects, the time location for an SSB may indicate a location in time of the SSB within a time window. The time window may correspond to, for example, one or more SS burst sets, one or more SS bursts, one or more SSB measurement time configuration (SMTC) windows (sometimes referred to as a measurement timing configuration window for synchronization signals), and/or the like. In some aspects, a time location may be associated with an SSB index (sometimes referred to as an index, an SSB index value, or an index value), and the configuration may indicate a time location for an SSB having a specific index value. In some aspects, the time location may be indicated as a symbol number (e.g., a symbol index) within the time window, as a combination of slot number and symbol number within the time window, or using some other combination of TTIs (e.g., symbol, mini-slot, slot, subframe, frame, and/or the like). For example, the configuration may indicate that an SSB having an index of 0 starts in symbol 0 of an SS burst set, an SSB having an index of 1 starts in symbol 4 of the SS burst set, and so on, as shown in FIG. 4. Additionally, or alternatively, the time location may be indicated as an offset from a start (e.g., a starting symbol) of the time window.

In some aspects, the configuration may indicate a time location for each SSB in the time window (e.g., for every SSB in the time window). Alternatively, the configuration may indicate a time location for each transmitted SSB in the time window. For example, the base station 110 may transmit fewer than all SSBs in the time window. In this case, the base station 110 may indicate a time location for only the SSBs that are actually transmitted by the base station 110, thereby conserving network resources.

In some aspects, the base station 110 may have full flexibility to configure time locations for SSBs. This may permit the base station 110 to maximize the number of SSBs that can be transmitted in accordance with the slot pattern. In this case, the base station 110 may indicate a time location for every SSB and/or for every transmitted SSB, as described above. In some aspects, the base station 110 may indicate time locations for SSBs for a single time window, and the same time locations may apply to other time windows. In this case, an SSB having a specific index may always occur in the same symbols across different time windows. For example, in example 400, an SSB with index 0 may always occur in symbol 0 of the SS burst set, an SSB with index 1 may always occur in symbol 4 of the SS burst set, and so on.

Alternatively, the base station 110 may indicate time locations for SSBs for a set of (e.g., consecutive) time windows, and the same time locations may apply to other sets of time windows. In this case, an SSB having a specific index may occur in different symbols across different time windows within the set of time windows, but the symbols in which the SSB occurs may be the same across different sets of time windows.

In some aspects, the base station 110 may configure all SSBs to have a same periodicity. In this case, all SSBs may be repeated (e.g. in a same time location) across different time windows. Alternatively, the base station 110 may configure different SSBs to have different periodicities. For example, a first periodicity of a first SSB may be different from a second periodicity of a second SSB. In this case, some SSBs may occur in a first number of time windows (e.g., every time window), and some SSBs may occur in a second number of time windows (e.g., every other time window).

In some aspects, the base station 110 may select a time location pattern from multiple time location patterns, and may indicate the selected time location pattern to the UE 120. A time location pattern may indicate time locations of SSBs in a time window (e.g., an SS burst set and/or the like). For example, a time location pattern may indicate time locations of all SSBs (or all transmitted SSBs) within the time window. In some aspects, multiple time location patterns may be prespecified (e.g., according to a wireless communication standard). In this case, the multiple time location patterns may be hard coded (e.g., as read-only data) and/or stored in memory of the base station 110 and/or the UE 120. Additionally, or alternatively, the multiple time location patterns may be determined by the base station 110 (e.g., according to one or more slot patterns, such as a slot pattern used by a serving cell, one or more slot patterns used by one or more neighbor cells, and/or the like). In some aspects, the base station 110 may indicate the multiple time location patterns to the UE 120 (e.g., in the configuration, an RRC message, a MAC-CE, system information, and/or the like). The UE 120 may store the multiple time location patterns in memory. The base station 110 may then indicate a time location pattern, of the multiple time location patterns, to be used by the UE 120 to monitor for SSBs.

In some aspects, the UE 120 may store a table that includes multiple table entries. A table entry may include an index value and information that identifies a time location pattern, and may indicate a relationship between the index value and the time location pattern. In some aspects, the base station 110 may configure the UE 120 with time location patterns (and corresponding index values) to be stored in the table. Additionally, or alternatively, the base station 110 may indicate a time location pattern to be used by the UE 120 by transmitting (e.g., in the configuration) an index value to the UE 120. The UE 120 may use the index value to look up a corresponding time location pattern in the table, and may use that time location pattern to monitor for SSBs.

In some aspects, the base station 110 may indicate one or more time location patterns corresponding to one or more neighbor cells. In some aspects, the same time location pattern may be used for multiple neighbor cells. Additionally, or alternatively, different time location patterns may be used for different neighbor cells. In some aspects, the base station 110 may indicate a time location pattern and a corresponding neighbor cell (e.g., using a cell identifier) of a neighbor cell for which the time location pattern is to be used. In some aspects, the base station 110 may determine a time location pattern for a neighbor cell based at least in part on a slot pattern of the neighbor cell. Additionally, or alternatively, a neighbor cell (e.g., a neighbor base station 110) may indicate the slot pattern and/or the time location pattern to the base station 110. In some aspects, the base station 110 may use such information associated with one or more neighbor cells to determine multiple time location patterns to be configured for the UE 120 (e.g., to be used to populate a table). In this way, latency may be reduced in mobility scenarios (e.g., handovers), spectral efficiency may be improved, and/or the like, via flexible configuration of SSB time location in accordance with TDD DL UL slot patterns.

In some aspects, the base station 110 may indicate the one or more time locations as one or more time offsets from a default time location pattern. For example, a default time location pattern may be prespecified (e.g., according to a wireless communication standard). In this case, the default time location patterns may be hard coded (e.g., as read-only data) and/or stored in memory of the base station 110 and/or the UE 120. Additionally, or alternatively, the default time location pattern may be determined by the base station 110 (e.g., according to one or more slot patterns), and/or may be indicated to the UE 120 by the base station 110 (e.g., in the configuration).

In some aspects, the base station 110 may indicate one or more time locations for one or more SSBs in a time window using one or more time offsets from the default time location pattern (e.g., corresponding to the time window). In some aspects, the time offset may have a granularity of one symbol. In some aspects, a single time offset value may be indicated, and that time offset value may be used to offset all SSBs in the time window from time locations for those SSBs in the default time location pattern. Alternatively, different time offset values may be indicated for different SSBs. In this case, a first SSB (e.g., having a first index) may be offset by a first number of TTIs (e.g., symbols) from a first time location of the first SSB in the default time location pattern, a second SSB (e.g., having a second index) may be offset by a second (e.g., different) number of TTIs from a second time location of the second SSB in the default time location pattern, and so on. In some aspects, the base station 110 may indicate a first set of SSBs (e.g., one or more SSBs) that have a first offset, a second set of SSBs that have a second offset, and so on. In this way, network resources may be conserved as compared to indicating an absolute time location for every SSB.

Although aspects are described above in connection with indicating one or more time locations for the SSBs, in some aspects, the base station 110 may indicate one or more frequency locations for the SSBs. In some aspects, the base station 110 may indicate a first frequency location for a first SSB (e.g., within a time window, such as an SS burst set), may indicate a second (different) frequency location for a second SSB (e.g., within the time window), and so on.

As shown by reference number 420, the base station 110 (a serving base station 110 or a neighbor base station 110) may transmit one or more SSBs in the SS burst set (or another time window). As shown in FIG. 4, in example 400, a first SSB (having index 0) is transmitted in symbols 0-3 of the SS burst set in downlink symbols of a slot pattern, a second SSB (having index 1) is transmitted in symbols 4-7 of the SS burst set in downlink symbols of a slot pattern, a third SSB (having index 2) is transmitted in symbols 8-11 of the SS burst set in downlink symbols of a slot pattern, a fourth SSB (having index 3) is transmitted in symbols 12-15 of the SS burst set in downlink symbols of a slot pattern, a fifth SSB (having index 4) is transmitted in symbols 16-19 of the SS burst set in downlink symbols of a slot pattern. As further shown, symbols 20-27 are uplink symbols and do not contain SSBs. The time locations of the SSBs shown in FIG. 4 are provided as an example, and other examples may be implemented. Furthermore, FIG. 4 shows only a portion of a SS burst set for simplicity.

As shown by reference number 430, the UE 120 may detect an SSB of the one or more SSBs transmitted by the base station 110. For example, the UE 120 may use the time locations of SSBs, indicated in the configuration, to determine symbols to monitor for SSBs. The UE 120 may detect an SSB based at least in part on such monitoring. The UE 120 may use an index of the SSB and may use the configuration (e.g., an indication of a time location corresponding to the index) to determine a cell timing. For example, because the time locations of the SSBs are indicated to the UE 120, the UE 120 can determine a time location corresponding to the detected SSB (e.g., by looking up the time location using the SSB index). The UE 120 may use the time location to synchronize one or more TTI boundaries (e.g., of a symbol, a slot, a subframe, a frame, and/or the like) with the base station 110.

In some aspects, the UE 120 may determine cell timing in association with a procedure for initial network access to a non-standalone (NSA) wireless network. Additionally, or alternatively, the UE 120 may determine cell timing in association with a mobility procedure (e.g., handover, a procedure with a neighbor cell, and/or the like).

As shown by reference number 440, in some aspects, a portion of the SSB index may be indicated using one or more bits of a master information block (MIB) included in the detected SSB. In this case, the base station 110 may transmit the SSB index using more than 6 bits. For example, the base station 110 may convey 3 bits of the SSB index using a demodulation reference signal (DMRS) of the PBCH, may convey 3 bits of the SSB index in the PBCH payload (e.g., other than the MIB), and may convey one or more bits of the SSB index in the MIB. Alternatively, the base station 110 may indicate the SSB index using a different combination of one or more bits of the DMRS, one or more bits of the PBCH payload (e.g., other than the MIB), and/or one or more bits of the MIB. Additionally, or alternatively, the base station 110 may indicate the SSB index using one or more bits of the MIB and information conveyed in the DMRS of the PBCH, the PBCH payload, an RRC message, a MAC-CE, system information, a control channel (e.g., the PDCCH), and/or the like. This allows the base station 110 to transmit and/or differentiate between more than 64 SSBs, and to indicate SSB index values for more than 64 SSBs (e.g., using more than 6 bits). For example, the base station 110 may be capable of indicating up to 128 SSB indices, up to 256 SSB indices, and/or the like.

In some aspects, the base station 110 may transmit more than 64 SSBs in an SS burst set, and may indicate SSB indices for those SSBs as described herein. For example, the base station 110 may use a subcarrier spacing of 240 kilohertz. In this case, the base station 110 may transmit SSBs throughout an SS burst set and/or an SMTC (e.g., in a first half and a second half of an SMTC) to transmit more than 64 SSBs (e.g., to transmit 128 SSBs). Additionally, or alternatively, the base station 110 may use a time location pattern that fits a greater number of SSBs in an SS burst set (e.g., as compared to a default and/or specified time location pattern).

As shown in FIG. 4, the one or more bits of the MIB used to indicate a portion of the SSB index may include one or more reserved bits of the MIB, one or more repurposed bits of the MIB, and/or the like. In some aspects, one or more bits of the MIB may be specified (e.g., according to a wireless communication standard) as carrying a portion of the SSB index.

In some aspects, one or more bits of the MIB may normally carry information that indicates a raster offset, a default downlink numerology, a remaining minimum system information configuration, a front-loaded demodulation reference signal, cell barring, cell reselection, and/or the like. In some aspects, one or more of these bits may be repurposed to carry a portion of the SSB index. For example, one or more fields (e.g., indicating the parameters indicated above) may not be needed in an NSA initial access procedure, a mobility procedure, and/or in an IAB network because the information in those fields may have already been conveyed to the UE 120, such as in a standalone initial access procedure, in an RRC message, and/or the like. Thus, the bits may be repurposed to carry a portion of the SSB index.

By using reserved and/or repurposed bits of the MIB to carry a portion of the SSB index, more than 64 SSB indices may be conveyed without increasing network overhead (e.g., without conveying additional bits that are not already conveyed). This permits the base station 110 to transmit more than 64 SSBs, thereby permitting more precise beamforming, more beams, more efficient use of spectral resources and/or spatial resources, and/or the like.

As indicated above, FIG. 4 is provided as an example. Other examples may differ from what is described with respect to FIG. 4.

Figure 5:
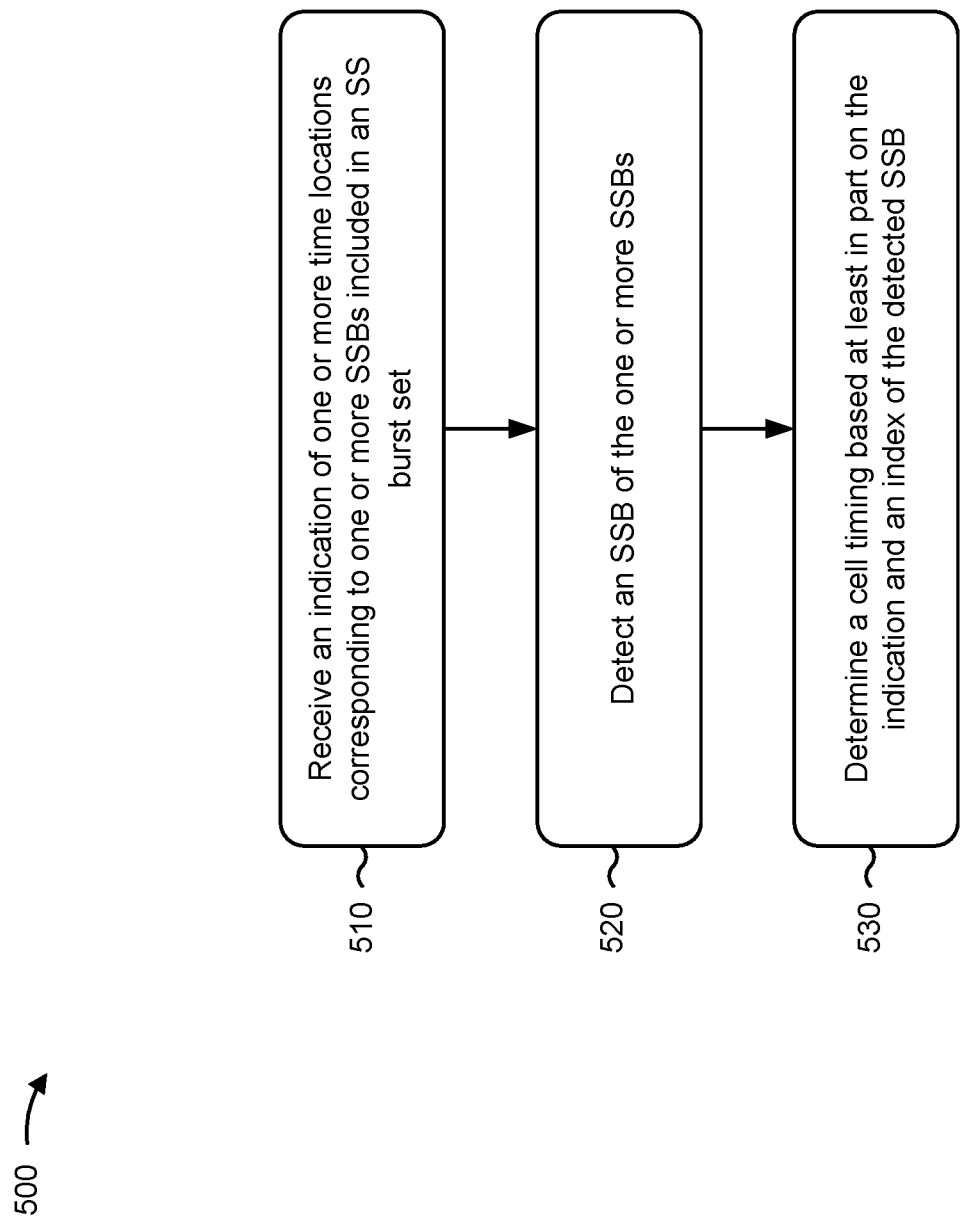
FIGS. 5-8 are flow charts of example methods of wireless communication.

FIG. 5 is a flow chart of a method 500 of wireless communication. The method 500 may be performed by a UE (e.g., the UE 120, the apparatus 902/902' of FIGS. 9-10, and/or the like).

At 510, the UE may receive an indication of one or more time locations corresponding to one or more SSBs included in an SS burst set. For example, the UE (e.g., using antenna 252, DEMOD 254, MIMO detector 256, receive processor 258, controller/processor 280, and/or the like) may receive an indication of one or more time locations, as described above. The one or more time locations may correspond to one or more SSBs included in an SS burst set. In some aspects, a time location for an SSB indicates a location in time of the SSB within the SS burst set or within an SMTC window.

In some aspects, the indication indicates a time location for each SSB in the SS burst set. In some aspects, the indication indicates a time location for each transmitted SSB in the SS burst set. In some aspects, the indication indicates a time location pattern of a plurality of time location patterns configured for the UE. In some aspects, the indication includes an index value corresponding to a table entry, wherein different table entries correspond to different time location patterns for different SSBs included in the SS burst set. In some aspects, the table entries are indicated to the UE by a base station. In some aspects, the UE is configured with different time location patterns, for SSBs in the SS burst set, for different neighbor cells. In some aspects, the one or more time locations are indicated as one or more time offsets from a default time location pattern. In some aspects, the indication may indicate multiple frequency locations associated with different SSBs included in the SS burst set.

At 520, the UE may detect an SSB of the one or more SSBs. For example, the UE (e.g., using antenna 252, DEMOD 254, MIMO detector 256, receive processor 258, controller/processor 280, and/or the like) may detect an SSB transmitted by a base station, as described above. In some aspects, all SSBs, included in the SS burst set, have a same periodicity. In some aspects, a first periodicity of a first SSB, included in the SS burst set, is different from a second periodicity of a second SSB included in the SS burst set. In some aspects, different SSBs, in the SS burst set, are associated with different time offsets.

At 530, the UE may determine a cell timing based at least in part on the indication and an index of the detected SSB. For example, the UE (e.g., using controller/processor 280 and/or the like) may determine a cell timing, as described above. In some aspects, the UE may determine the cell timing based at least in part on the indication and/or an index of the detected SSB. In some aspects, the UE may determine a cell timing for an NSA procedure, a mobility scenario, and/or the like.

Method 500 may include additional aspects, such as any single aspect and/or any combination of aspects described in connection with one or more other methods and/or operations described elsewhere herein.

Although FIG. 5 shows example blocks of a method 500 of wireless communication, in some aspects, method 500 may include additional blocks, fewer blocks, different blocks, or differently arranged blocks than those shown in FIG. 5. Additionally, or alternatively, two or more blocks shown in FIG. 5 may be performed in parallel.

Figure 6:
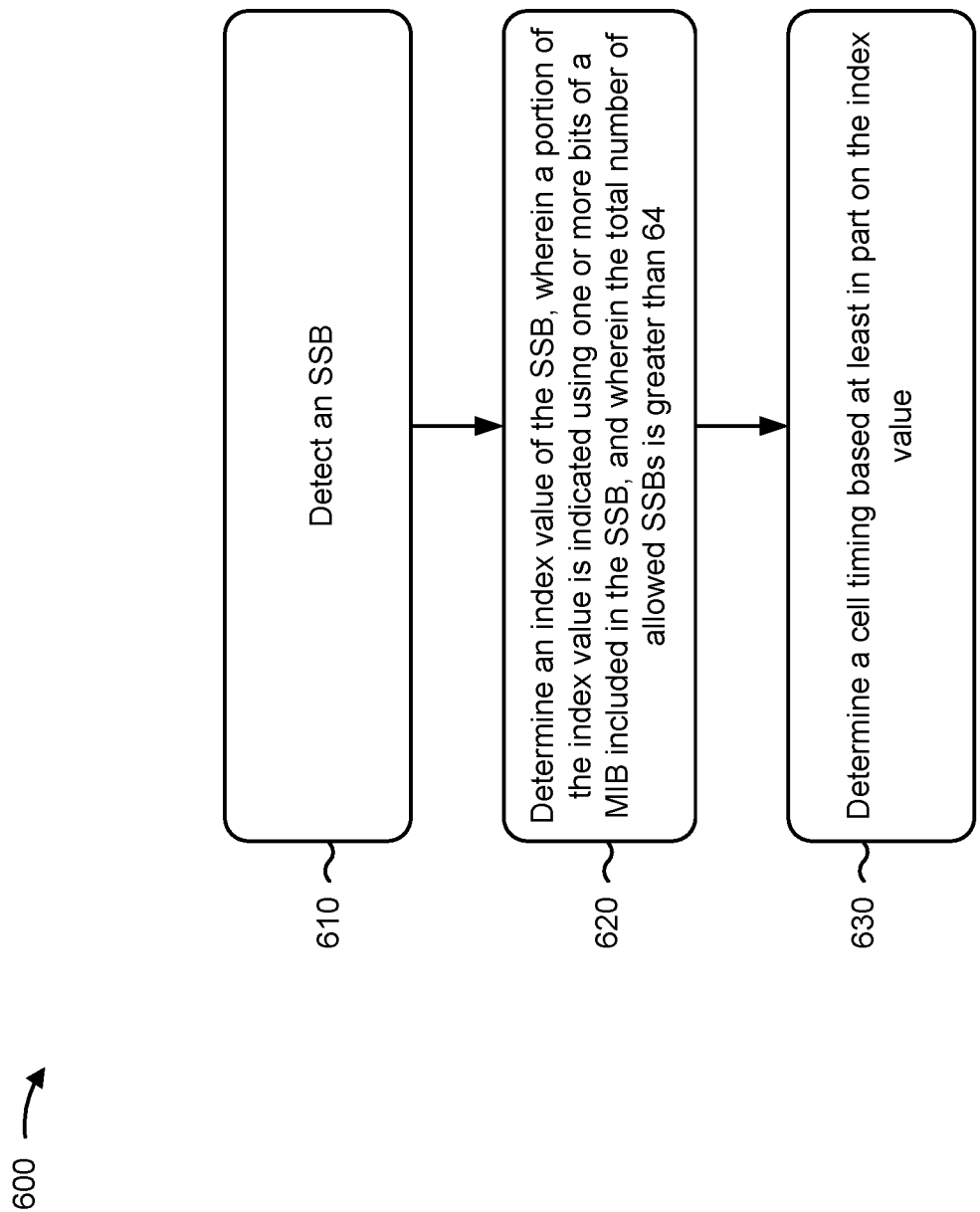

FIG. 6 is a flow chart of a method 600 of wireless communication. The method 600 may be performed by a UE (e.g., the UE 120, the apparatus 902/902' of FIGS. 9-10, and/or the like).

At 610, the UE may detect an SSB. For example, the UE (e.g., using antenna 252, DEMOD 254, MIMO detector 256, receive processor 258, controller/processor 280, and/or the like) may detect an SSB, as described above. In some aspects, the UE may detect an SSB transmitted by a base station. In some aspects, the UE may monitor one or more time locations for one or more SSBs to detect the SSB. In some aspects, the one or more time locations may be indicated to the UE by the base station, as described above. In some aspects, the SSB is associated with a subcarrier spacing of 240 kilohertz and is detected in a second half of an SMTC window. In some aspects, more than 64 SSBs are transmitted in an SS burst set.

At 620, the UE may determine an index value of the SSB, wherein a portion of the index value is indicated using one or more bits of a MIB included in the SSB, and wherein a total number of allowed SSBs is greater than 64. For example, the UE (e.g., using controller/processor 280 and/or the like) may determine an index value of the SSB, as described above. In some aspects, a portion of the index value is indicated using one or more bits of a MIB included in the SSB. In some aspects, a total number of allowed SSBs is greater than 64. In some aspects, the one or more bits include one or more reserved bits of the MIB, one or more repurposed bits of the MIB, and/or the like. In some aspects, the one or more repurposed bits include one or more bits for indicating a raster offset, a default downlink numerology, a remaining minimum system information configuration, a front-loaded demodulation reference signal, cell barring, cell reselection, or a combination thereof.

In some aspects, the base station is configured to indicate more than 64 SSB index values using the one or more bits of the MIB and a DMRS of a PBCH conveyed in the SSB. In some aspects, the base station is configured to indicate more than 64 SSB index values using the one or more bits of the MIB and information conveyed in at least one of a radio resource control message, system information, a media access control (MAC) control element, a control channel, or a combination thereof.

At 630, the UE may determine a cell timing based at least in part on the index value. For example, the UE (e.g., using controller/processor 280 and/or the like) may determine a cell timing, as described above. In some aspects, the UE may determine the cell timing based at least in part on the index value. In some aspects, the UE may determine a cell timing for an NSA procedure, a mobility scenario, and/or the like.

Method 600 may include additional aspects, such as any single aspect and/or any combination of aspects described in connection with one or more other methods and/or operations described elsewhere herein.

Although FIG. 6 shows example blocks of a method 600 of wireless communication, in some aspects, method 600 may include additional blocks, fewer blocks, different blocks, or differently arranged blocks than those shown in FIG. 6. Additionally, or alternatively, two or more blocks shown in FIG. 6 may be performed in parallel.

Figure 7:
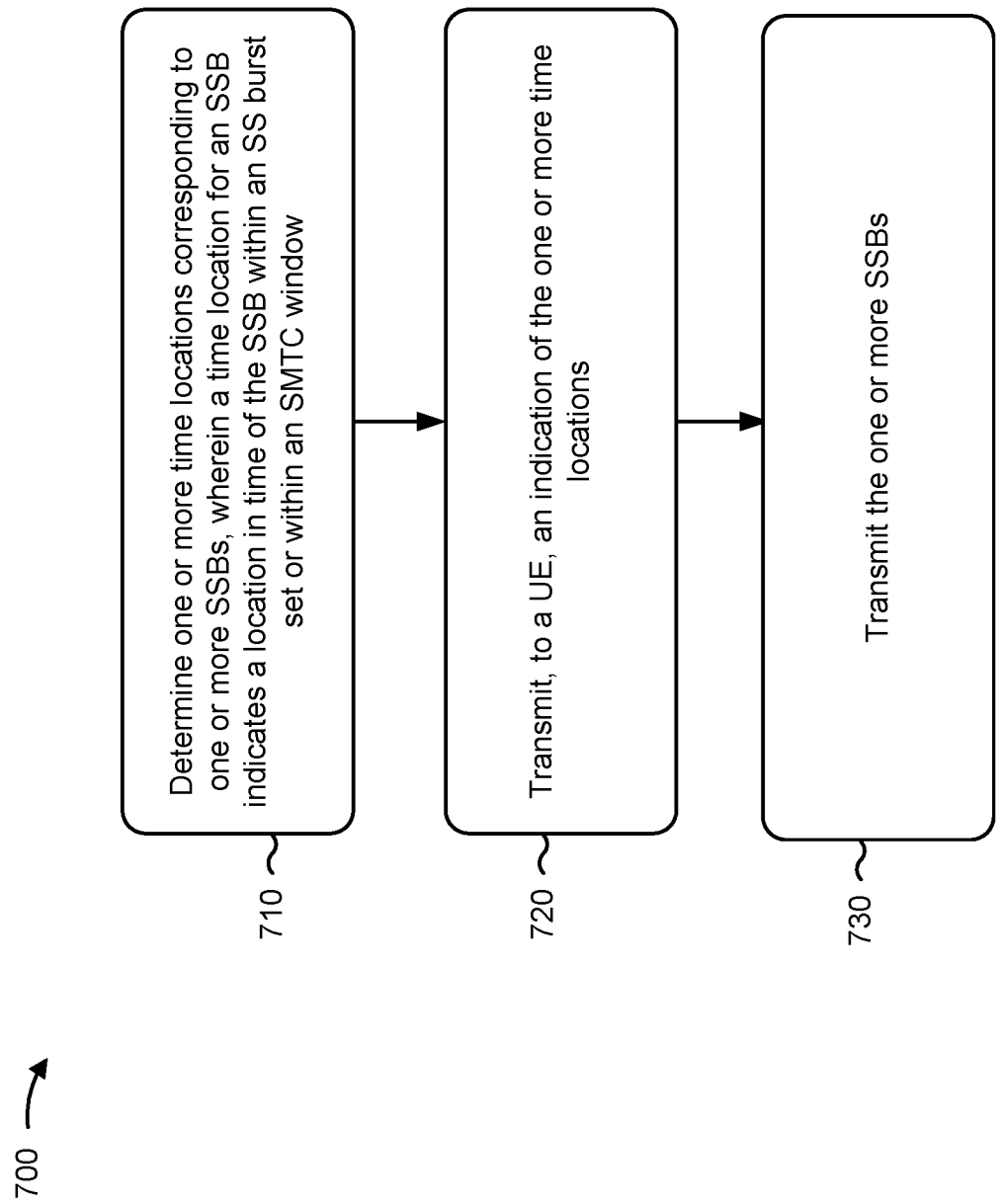

FIG. 7 is a flow chart of a method 700 of wireless communication. The method 700 may be performed by a base station (e.g., the base station 110, the apparatus 1102/1102' of FIGS. 11-12, and/or the like).

At 710, the base station may determine one or more time locations corresponding to one or more SSBs, wherein a time location for an SSB indicates a location in time of the SSB within an SS burst set or within an SMTC window. For example, the base station (e.g., using controller/processor 240 and/or the like) may determine one or more time locations corresponding to one or more SSBs, as described above. In some aspects, a time location for an SSB indicates a location in time of the SSB within an SS burst set, within an SMTC window, and/or the like. In some aspects, the one or more time locations are determined based at least in part on a slot pattern configured by the base station.

At 720, the base station may transmit, to a UE, an indication of the one or more time locations. For example, the base station (e.g., using controller/processor 240, transmit processor 220, TX MIMO processor 230, MOD 232, antenna 234, and/or the like) may transmit an indication of the one or more time locations, as described above. In some aspects, the indication indicates a time location for each SSB in the SS burst set. In some aspects, the indication indicates a time location for each transmitted SSB in the SS burst set. In some aspects, the one or more time locations are indicated as one or more time offsets from a default time location pattern. In some aspects, different SSBs, in the SS burst set, are associated with different time offsets.

In some aspects, the indication indicates a time location pattern of a plurality of time location patterns configured for the UE. In some aspects, the indication includes an index value corresponding to a table entry, wherein different table entries correspond to different time location patterns for different SSBs included in the SS burst set. In some aspects, the table entries are indicated to the UE by the base station. In some aspects, the base station configures the UE with different time location patterns, for SSBs in the SS burst set, for different neighbor cells. In some aspects, the base station may transmit an indication of multiple frequency locations associated with different SSBs included in the SS burst set.

At 730, the base station may transmit the one or more SSBs. For example, the base station (e.g., using controller/processor 240, transmit processor 220, TX MIMO processor 230, MOD 232, antenna 234, and/or the like) may transmit one or more SSBs within an SS burst set or another time window, as described above. In some aspects, all SSBs, included in the SS burst set, have a same periodicity. In some aspects, a first periodicity of a first SSB, included in the SS burst set, is different from a second periodicity of a second SSB included in the SS burst set.

Method 700 may include additional aspects, such as any single aspect and/or any combination of aspects described in connection with one or more other methods and/or operations described elsewhere herein.

Although FIG. 7 shows example blocks of a method 700 of wireless communication, in some aspects, method 700 may include additional blocks, fewer blocks, different blocks, or differently arranged blocks than those shown in FIG. 7. Additionally, or alternatively, two or more blocks shown in FIG. 7 may be performed in parallel.

Figure 8:
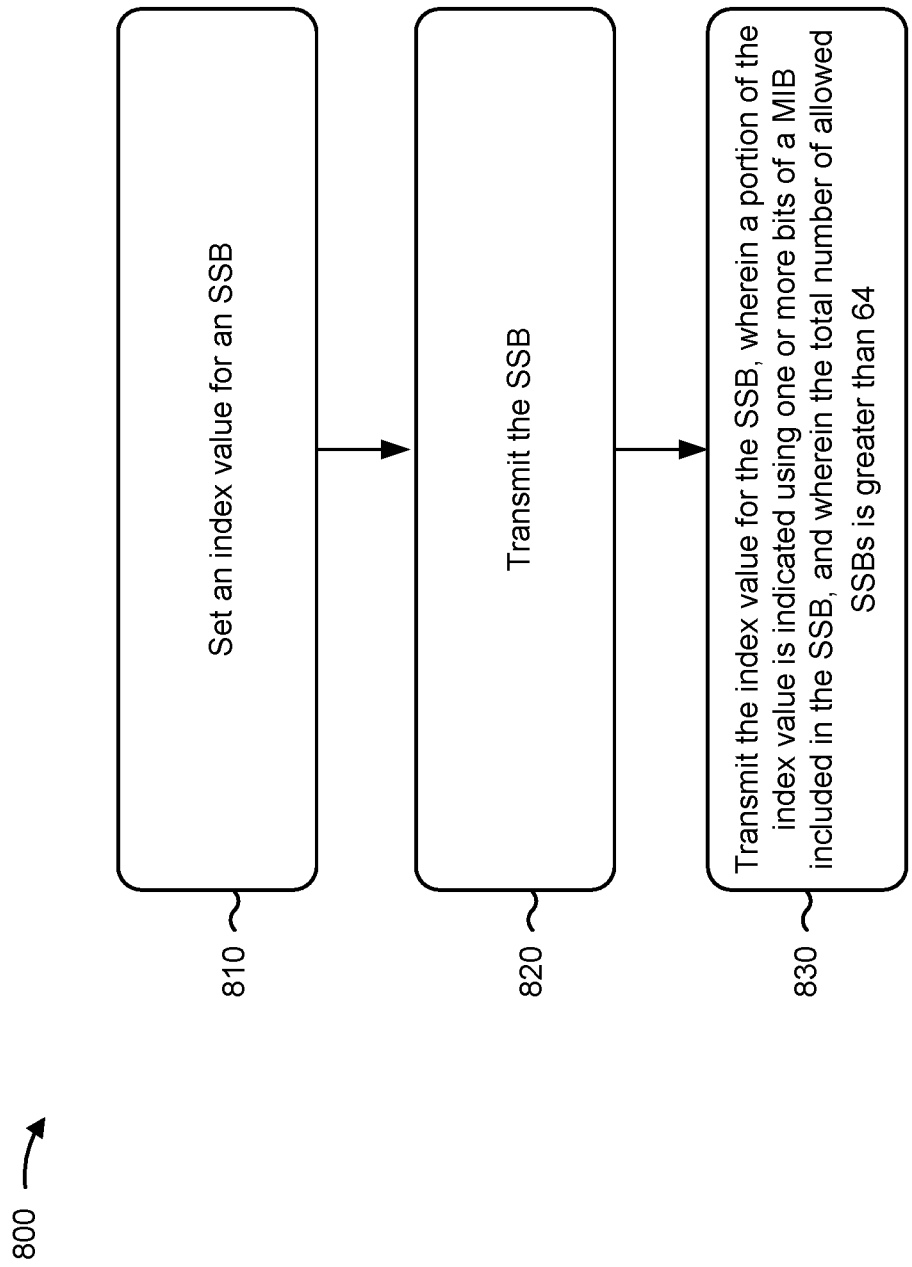

FIG. 8 is a flow chart of a method 800 of wireless communication. The method 800 may be performed by a base station (e.g., the base station 110, the apparatus 1102/1102' of FIGS. 11-12, and/or the like).

At 810, the base station may set an index value for an SSB. For example, the base station (e.g., using controller/processor 240 and/or the like) may set an index value for an SSB, as described above. In some aspects, the base station is capable of setting more than 64 SSB index values using the one or more bits of a MIB and a DMRS of a PBCH conveyed in the SSB. In some aspects, the base station is capable of setting more than 64 SSB index values using the one or more bits of the MIB and information conveyed in at least one of a radio resource control message, system information, a MAC-CE, a control channel, or a combination thereof.

At 820, the base station may transmit the SSB. For example, the base station (e.g., using controller/processor 240, transmit processor 220, TX MIMO processor 230, MOD 232, antenna 234, and/or the like) may transmit the SSB in a time window, as described above. In some aspects, the time window may include an SS burst set, an SS burst, an SMTC, and/or the like. In some aspects, the SSB is associated with a subcarrier spacing of 240 kilohertz and is transmitted in a second half of an SMTC window. In some aspects, the base station transmits more than 64 SSBs in an SS burst set.

At 830, the base station may transmit the index value for the SSB, wherein a portion of the index value is indicated using one or more bits of a MIB included in the SSB, and wherein a total number of allowed SSBs is greater than 64. For example, the base station (e.g., using controller/processor 240, transmit processor 220, TX MIMO processor 230, MOD 232, antenna 234, and/or the like) may transmit the index value. In some aspects, the base station may transmit the index value in the SSB. In some aspects, a portion of the index value is indicated using one or more bits of a MIB included in the SSB. In some aspects, a total number of allowed SSBs is greater than 64.

In some aspects, the one or more bits include one or more reserved bits of the MIB, one or more repurposed bits of the MIB, or a combination thereof. In some aspects, the one or more repurposed bits include one or more bits for indicating a raster offset, a default downlink numerology, a remaining minimum system information configuration, a front-loaded demodulation reference signal, cell barring, cell reselection, or a combination thereof.

In some aspects, the base station is configured to indicate more than 64 SSB index values using the one or more bits of the MIB and a DMRS of a PBCH conveyed in the SSB. In some aspects, the base station is configured to indicate more than 64 SSB index values using the one or more bits of the MIB and information conveyed in at least one of a radio resource control message, system information, a MAC-CE, a control channel, or a combination thereof.

Method 800 may include additional aspects, such as any single aspect and/or any combination of aspects described in connection with one or more other methods and/or operations described elsewhere herein.

Although FIG. 8 shows example blocks of a method 800 of wireless communication, in some aspects, method 800 may include additional blocks, fewer blocks, different blocks, or differently arranged blocks than those shown in FIG. 8. Additionally, or alternatively, two or more blocks shown in FIG. 8 may be performed in parallel.

Figure 9:
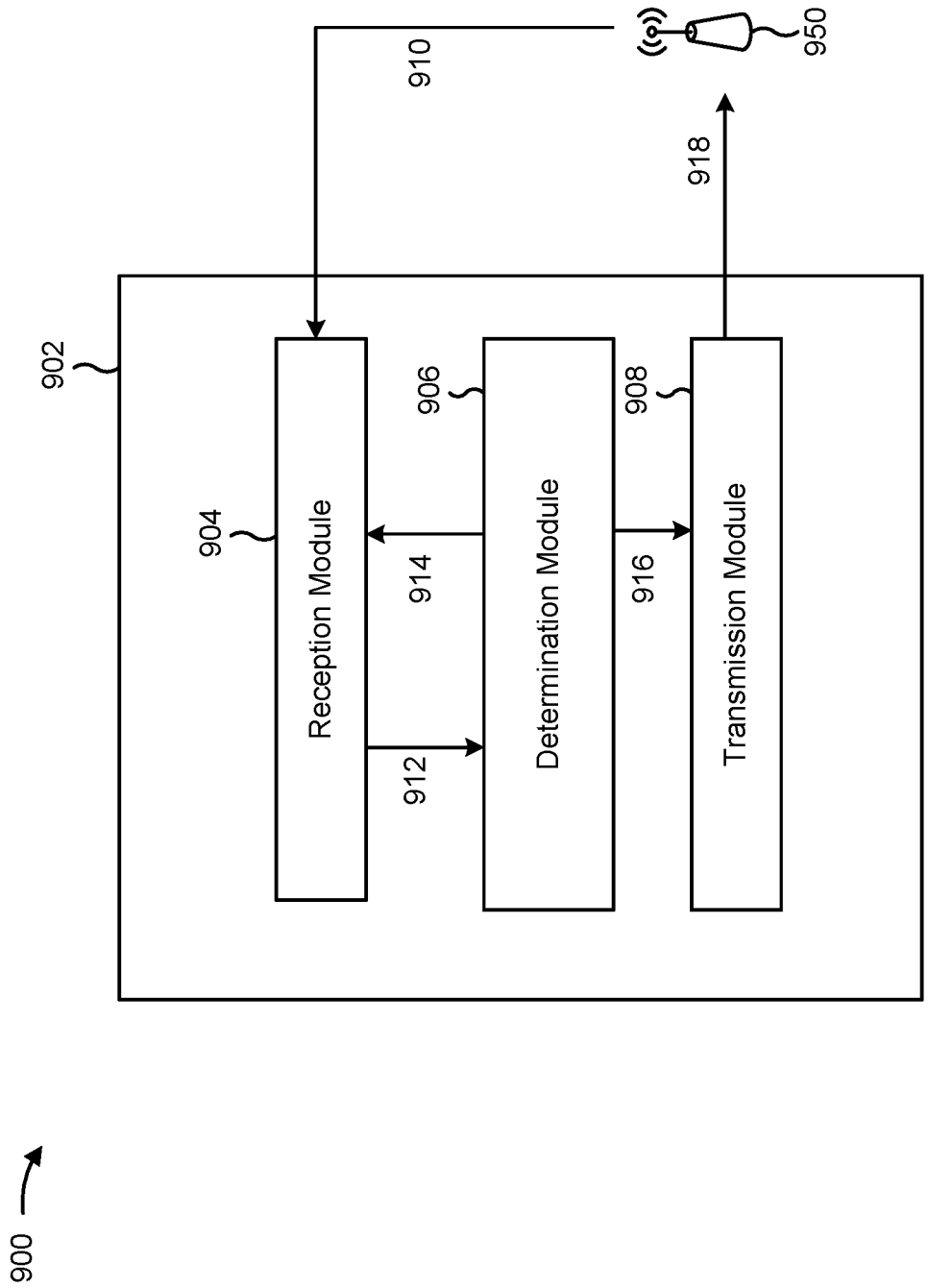
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a UE. In some aspects, the apparatus 902 includes a reception module 904, a determination module 906, a transmission module 908, and/or the like.

In some aspects, the reception module 904 may receive, as data 910, an indication of one or more time locations corresponding to one or more SSBs included in an SS burst set. Additionally, or alternatively, the reception module 904 may detect, as data 910, an SSB of the one or more SSBs. The reception module 904 may provide information regarding the one or more time locations and/or the detected SSB to the determination module 906 as data 912. The determination module 906 may determine a cell timing based at least in part on the indication and an index of the detected SSB. The determination module 906 may provide information regarding the cell timing to the reception module 904, as data 914, and/or to the transmission module 908, as data 916, to assist with synchronizing communications of the apparatus 902 and an apparatus 950 (e.g., a base station), such as communications received from the apparatus 950 as data 910 and/or communication transmitted to the apparatus 950 as data 918.

Additionally, or alternatively, the reception module 904 may detect, as data 910, an SSB. The reception module 904 may provide information regarding the detected SSB to the determination module 906 as data 912. The determination module 906 may determine an index value of the SSB based at least in part on one or more bits of a MIB included in the SSB. Additionally, or alternatively, the determination module 906 may determine a cell timing based at least in part on the index value. The determination module 906 may provide information regarding the cell timing to the reception module 904, as data 914, and/or to the transmission module 908, as data 916, to assist with synchronizing communications of the apparatus 902 and an apparatus 950 (e.g., a base station), such as communications received from the apparatus 950 as data 910 and/or communication transmitted to the apparatus 950 as data 918.

The apparatus may include additional modules that perform each of the blocks of the aforementioned method 500 of FIG. 5, method 600 of FIG. 6, and/or the like. Each block in the aforementioned method 500 of FIG. 5, method 600 of FIG. 6, and/or the like may be performed by a module, and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
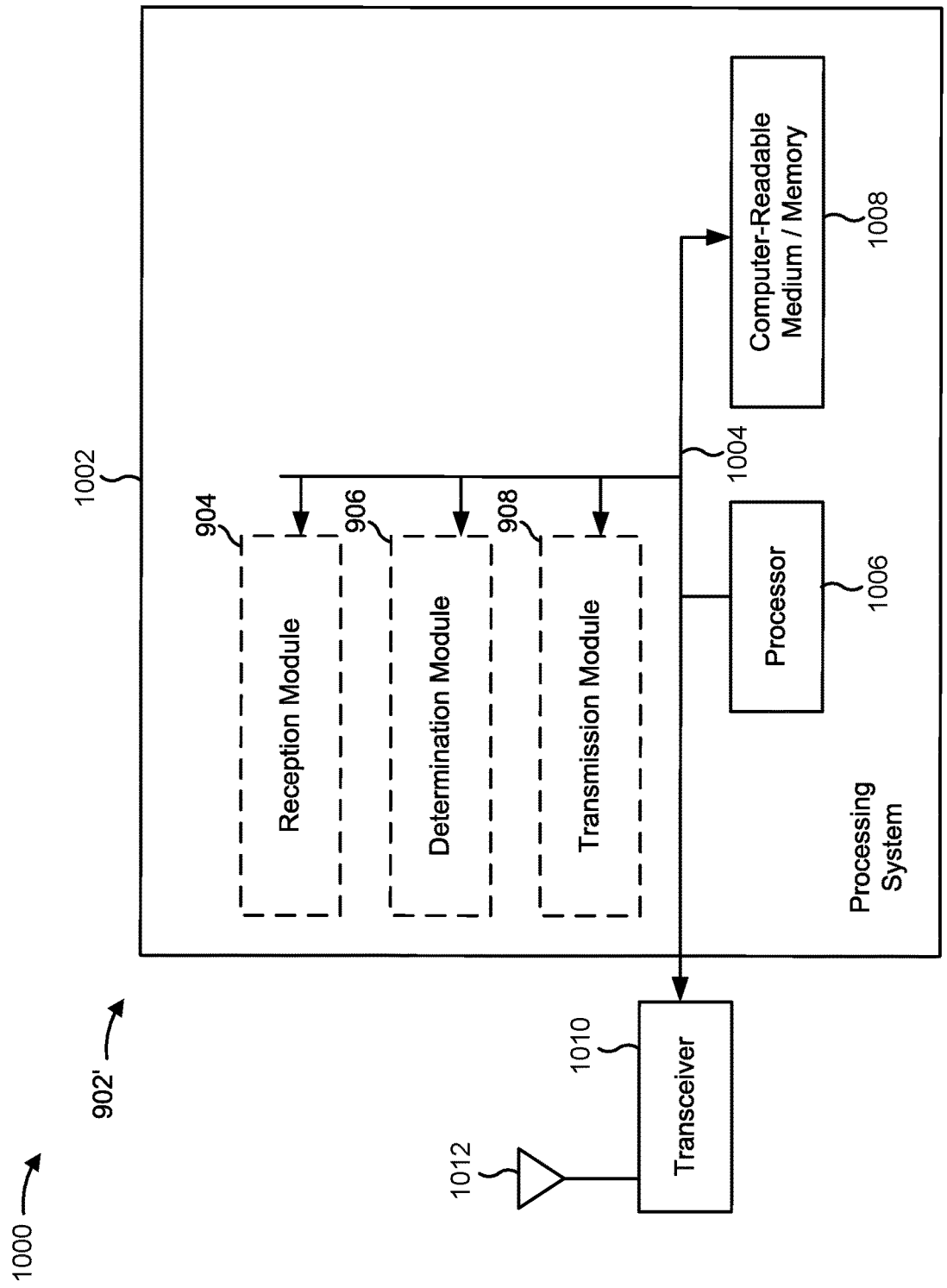
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, and/or 908, and the (non-transitory) computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904, 906, 908, and/or the like. The modules may be software modules running in the processor 1006, resident/stored in the computer readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving an indication of one or more time locations corresponding to one or more SSBs included in an SS burst set; means for detecting an SSB of the one or more SSBs; means for determining a cell timing based at least in part on the indication and an index of the detected SSB; and/or the like. Additionally, or alternatively, the apparatus 902/902' for wireless communication may include means for detecting an SSB; means for determining an index value of the SSB, wherein a portion of the index value is indicated using one or more bits of a MIB included in the SSB, and wherein a total number of allowed SSBs is greater than 64; means for determining a cell timing based at least in part on the index value; and/or the like. The aforementioned means may be one or more of the aforementioned modules of the apparatus 902 and/or the processing system 1002 of the apparatus 902' configured to perform the functions recited by the aforementioned means. As described supra, the processing system 1002 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 10 is provided as an example. Other examples may differ from what is described in connection with FIG. 10.

Figure 11:
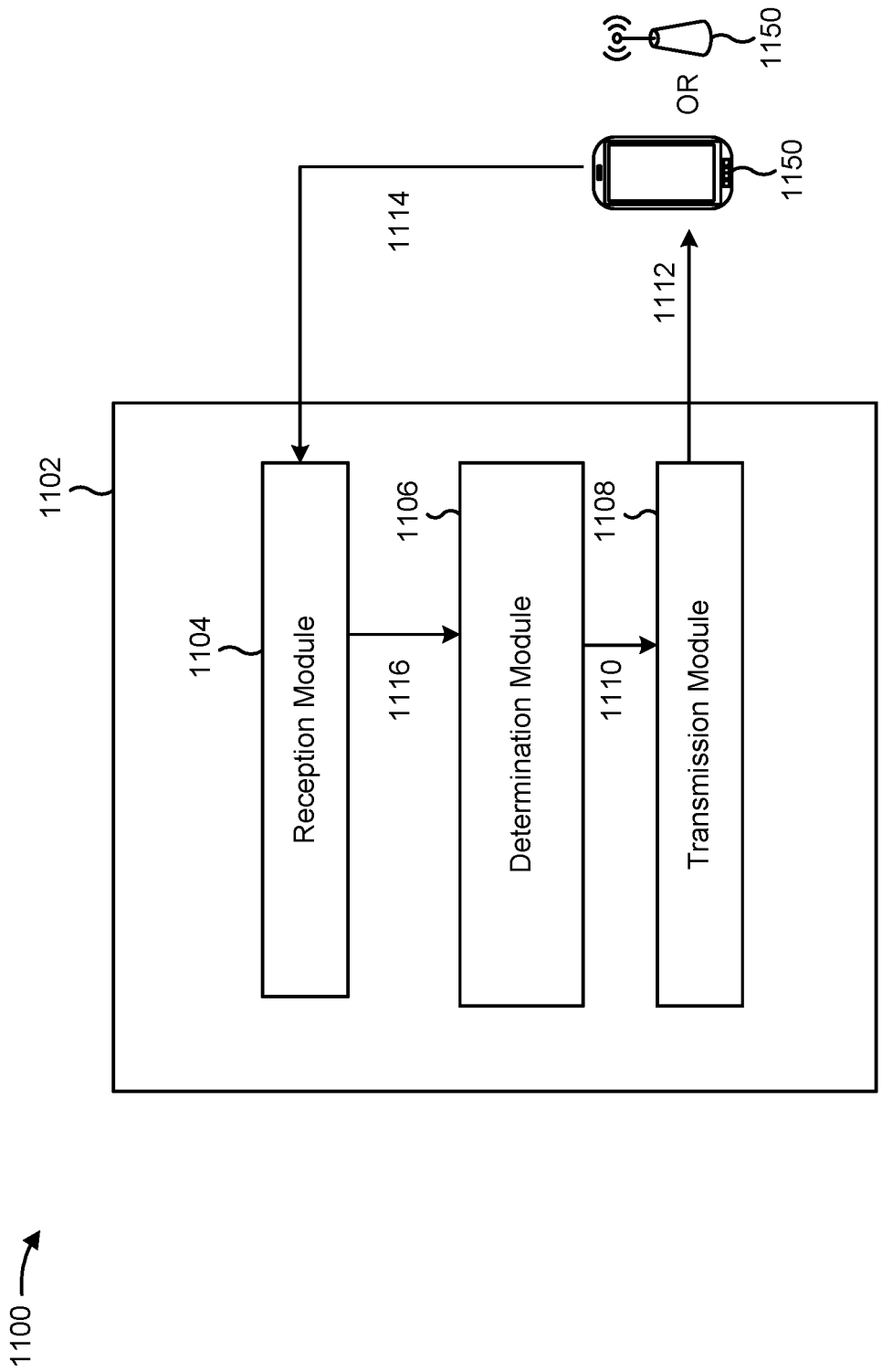
FIG. 11 is a conceptual data flow diagram illustrating the data flow between different modules/means/components in another example apparatus.

FIG. 11 is a conceptual data flow diagram 1100 illustrating the data flow between different modules/means/components in an example apparatus 1102. The apparatus 1102 may be a base station. In some aspects, the apparatus 1102 includes a reception module 1104, a determination module 1106, a transmission module 1108, and/or the like.

In some aspects, the determination module 1106 may determine one or more time locations corresponding to one or more SSBs. In some aspects, a time location for an SSB indicates a location in time of the SSB within an SS burst set or within an SMTC window. The determination module 1106 may provide information regarding the one or more time locations to the transmission module 1108 as data 1110. The transmission module may transmit, as data 1112, an indication of the one or more time locations to an apparatus 1150 (e.g., a UE or a base station). Additionally, or alternatively, the transmission module 1108 may transmit, as data 1112, the one or more SSBs in the one or more time locations. In some aspects, the reception module 1104 may receive, as data 1114, information from one or more neighbor apparatuses 1150 (e.g., neighbor base stations). The reception module 1104 may provide such information to the determination module 1106 as data 1116. In some aspects, the determination module 1106 may use such information to determine the one or more time locations. Additionally, or alternatively, the transmission module 1108 may transmit, as data 1112, an SSB. In some aspects, the transmission module 1108 may transmit, as data 1112, an index value for the SSB, wherein a portion of the index value is indicated using one or more bits of a MIB included in the SSB.

The apparatus may include additional modules that perform each of the blocks of the aforementioned method 700 of FIG. 7, method 800 of FIG. 8, and/or the like. Each block in the aforementioned method 700 of FIG. 7, method 800 of FIG. 68 and/or the like may be performed by a module, and the apparatus may include one or more of those modules. The modules may be one or more hardware components specifically configured to carry out the stated processes, implemented by a processor configured to perform the stated processes, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
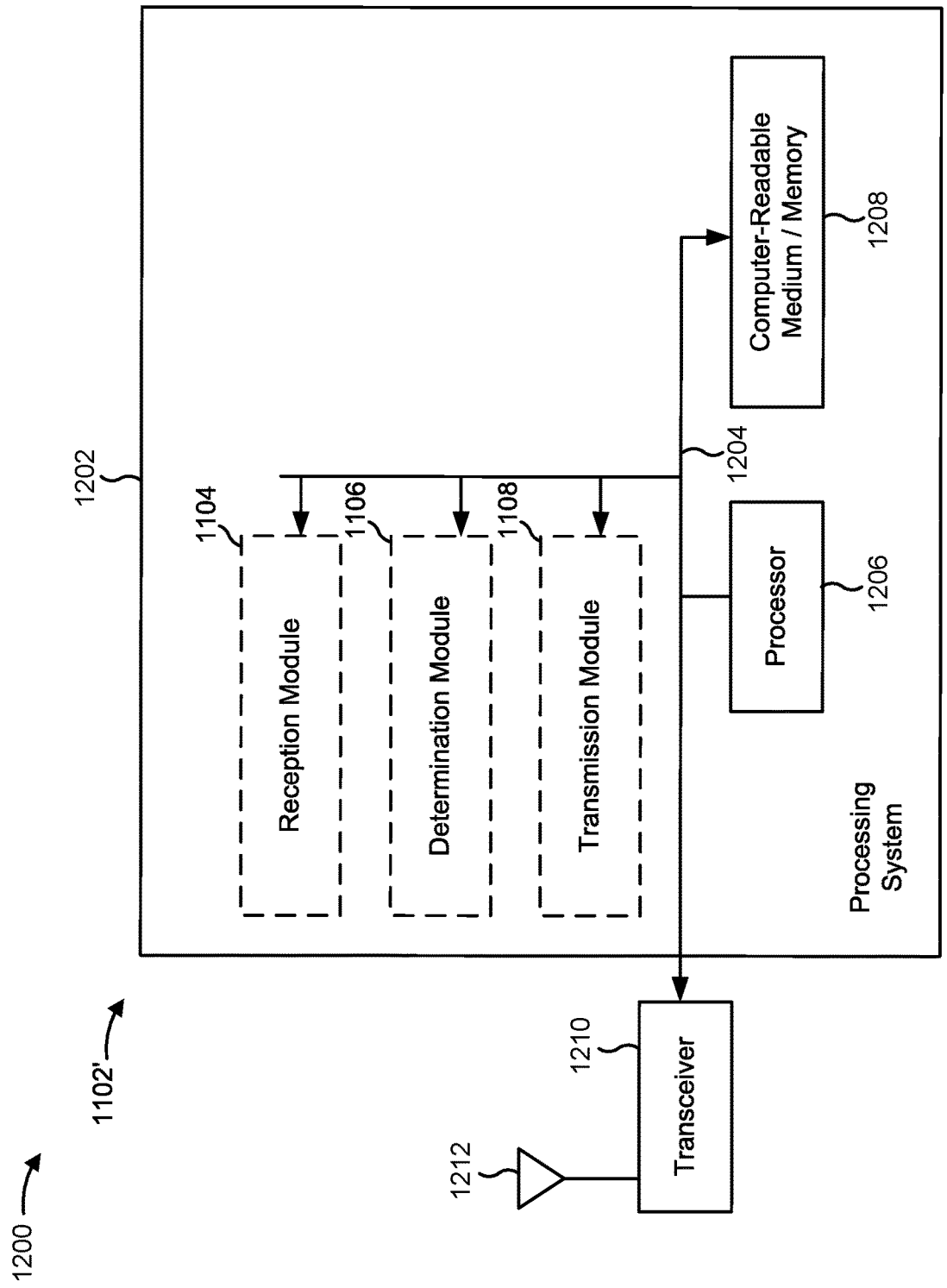
FIG. 12 is a diagram illustrating an example of a hardware implementation for another apparatus employing a processing system.

FIG. 12 is a diagram 1200 illustrating an example of a hardware implementation for an apparatus 1102' employing a processing system 1202. The apparatus 1102' may be a base station.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, and/or 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the modules 1104, 1106, 1108, and/or the like. The modules may be software modules running in the processor 1206, resident/stored in the computer readable medium/memory 1208, one or more hardware modules coupled to the processor 1206, or some combination thereof. The processing system 1202 may be a component of the eNB 110 and may include the memory 242 and/or at least one of the TX MIMO processor 230, the RX processor 238, and/or the controller/processor 240.

In some aspects, the apparatus 1102/1102' for wireless communication includes means for determining one or more time locations corresponding to one or more SSBs, wherein a time location for an SSB indicates a location in time of the SSB within an SS burst set or within an SMTC window; means for transmitting, to a UE, an indication of the one or more time locations; and/or the like. Additionally, or alternatively, the apparatus 1102/1102' for wireless communication may include means for transmitting an SSB; means for transmitting an index value for the SSB, wherein a portion of the index value is indicated using one or more bits of a MIB included in the SSB, and wherein a total number of allowed SSBs is greater than 64; and/or the like. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 12 is provided as an example. Other examples may differ from what is described in connection with FIG. 12.

It is to be understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
receiving an indication of one or more time locations corresponding to one or more synchronization signal blocks (SSBs) included in a synchronization signal (SS) burst set and corresponding to one or more neighbor cells;
detecting an SSB of the one or more SSBs,
wherein a time location for the detected SSB indicates a location in time of the detected SSB within the SS burst set or within an SSB measurement time configuration (SMTC) window; and
determining a cell timing of the one or more neighbor cells based at least in part on the indication and an index, of the detected SSB, corresponding to the one or more time locations.

2. The method of claim 1, further comprising receiving an indication of multiple frequency locations associated with different SSBs included in the SS burst set.

3. The method of claim 1, wherein the indication indicates a time location for each SSB in the SS burst set or for each transmitted SSB in the SS burst set.

4. The method of claim 1, wherein all SSBs, included in the SS burst set, have a same periodicity.

5. The method of claim 1, wherein a first periodicity of a first SSB, included in the SS burst set, is different from a second periodicity of a second SSB included in the SS burst set.

6. The method of claim 1, wherein the indication indicates a time location pattern of a plurality of time location patterns configured for the UE.

7. The method of claim 1, wherein the indication includes an index value corresponding to a table entry, wherein different table entries correspond to different time location patterns for different SSBs included in the SS burst set.

8. The method of claim 7, wherein the different table entries are indicated to the UE by a network entity.

9. The method of claim 7, wherein the UE is configured with different time location patterns, for SSBs in the SS burst set, for different neighbor cells.

10. The method of claim 1, wherein the one or more time locations are indicated as one or more time offsets from a default time location pattern.

11. The method of claim 10, wherein different SSBs, in the SS burst set, are associated with different time offsets of the one or more time offsets.

12. A method of wireless communication performed by a network entity, comprising:
determining one or more time locations corresponding to one or more synchronization signal blocks (SSBs) and corresponding to one or more neighbor cells,
wherein a time location for a synchronization signal block (SSB) indicates a location in time of the SSB within a synchronization signal (SS) burst set or within an SSB measurement time configuration (SMTC) window; and
transmitting, to a user equipment (UE), an indication of the one or more time locations,
wherein an index of the SSB corresponds to the time location, and
wherein a cell timing of the one or more neighbor cells is determined based at least in part on the index.

13. The method of claim 12, further comprising transmitting an indication of multiple frequency locations associated with different SSBs included in the SS burst set.

14. The method of claim 12, wherein the indication indicates:
a time location for each SSB in the SS burst set,
a time location for each transmitted SSB in the SS burst set,
a time location pattern of a plurality of time location patterns configured for the UE, or
a combination thereof.

15. The method of claim 12, wherein all SSBs included in the SS burst set have a same periodicity, or wherein a first periodicity of a first SSB included in the SS burst set is different from a second periodicity of a second SSB included in the SS burst set.

16. The method of claim 12, wherein the indication includes an index value corresponding to a table entry, wherein different table entries correspond to different time location patterns for different SSBs included in the SS burst set.

17. The method of claim 12, wherein the one or more time locations are:
indicated as one or more time offsets from a default time location pattern,
determined based at least in part on a slot pattern configured by the network entity, or
a combination thereof.

18. A user equipment (UE) for wireless communication, comprising:
a memory; and
one or more processors, coupled to the memory, configured to:
receive an indication of one or more time locations corresponding to one or more synchronization signal blocks (SSBs) included in a synchronization signal (SS) burst set and corresponding to one or more neighbor cells;
detect an SSB of the one or more SSBs,
wherein a time location for the detected SSB indicates a location in time of the detected SSB within the SS burst set or within an SSB measurement time configuration (SMTC) window; and
determine a cell timing of the one or more neighbor cells based at least in part on the indication and an index, of the detected SSB, corresponding to the one or more time locations.

19. The UE of claim 18, wherein the one or more processors are further configured to receive an indication of multiple frequency locations associated with different SSBs included in the SS burst set.

20. The UE of claim 18, wherein the indication indicates a time location for each SSB in the SS burst set or for each transmitted SSB in the SS burst set.

21. The UE of claim 18, wherein all SSBs, included in the SS burst set, have a same periodicity.

22. The UE of claim 18, wherein a first periodicity of a first SSB, included in the SS burst set, is different from a second periodicity of a second SSB included in the SS burst set.

23. The UE of claim 18, wherein the indication indicates a time location pattern of a plurality of time location patterns configured for the UE.

24. The UE of claim 18, wherein the indication includes an index value corresponding to a table entry, wherein different table entries correspond to different time location patterns for different SSBs included in the SS burst set.

25. The UE of claim 24, wherein the different table entries are indicated to the UE by a network entity.

26. A network entity for wireless communication, comprising:
a memory; and
one or more processors, coupled to the memory, configured to:
determine one or more time locations corresponding to one or more synchronization signal blocks (SSBs) and corresponding to one or more neighbor cells,
wherein a time location for a synchronization signal block (SSB) indicates a location in time of the SSB within a synchronization signal (SS) burst set or within an SSB measurement time configuration (SMTC) window; and
transmit, to a user equipment (UE), an indication of the one or more time locations,
wherein an index of the SSB corresponds to the time location, and
wherein a cell timing of the one or more neighbor cells is determined based at least in part on the index.

27. The network entity of claim 26, wherein the one or more processors are further configured to transmit an indication of multiple frequency locations associated with different SSBs included in the SS burst set.

28. The network entity of claim 26, wherein the indication indicates:
a time location for each SSB in the SS burst set,
a time location for each transmitted SSB in the SS burst set,
a time location pattern of a plurality of time location patterns configured for the UE, or
a combination thereof.

29. The network entity of claim 26, wherein all SSBs included in the SS burst set have a same periodicity, or wherein a first periodicity of a first SSB included in the SS burst set is different from a second periodicity of a second SSB included in the SS burst set.

30. The network entity of claim 26, wherein the indication includes an index value corresponding to a table entry, wherein different table entries correspond to different time location patterns for different SSBs included in the SS burst set.

* * * * *